United States Patent
Materie (10) Patent No.: US 11,738,307 B2
(45) Date of Patent: Aug. 29, 2023

(54) METHOD AND APPARATUS FOR CARBON DIOXIDE CAPTURE AND RELEASE

(71) Applicant: HOT LIME LABS LIMITED, Lower Hutt (NZ)

(72) Inventor: Vlatko Materie, Wellington (NZ)

(73) Assignee: HOT LIME LABS LIMITED, Gracefield (NZ)

( * ) Notice: Subject to any disclaimer, the term of this patent is extended or adjusted under 35 U.S.C. 154(b) by 851 days.

(21) Appl. No.: 16/492,152

(22) PCT Filed: Mar. 9, 2018

(86) PCT No.: PCT/NZ2018/050026
§ 371 (c)(1),
(2) Date: Sep. 8, 2019

(87) PCT Pub. No.: WO2018/164589
PCT Pub. Date: Sep. 13, 2018

(65) Prior Publication Data
US 2021/0146302 A1 May 20, 2021

(30) Foreign Application Priority Data
Mar. 9, 2017 (NZ) ........................................ 729897

(51) Int. Cl.
| | | |
|---|---|---|
| *C01B 32/914* | (2017.01) | |
| *B01D 53/62* | (2006.01) | |
| *C01B 32/60* | (2017.01) | |
| *B01J 20/04* | (2006.01) | |
| *B01J 20/06* | (2006.01) | |
| *B01J 20/28* | (2006.01) | |
| *B01J 20/30* | (2006.01) | |
| *C01F 11/18* | (2006.01) | |

(52) U.S. Cl.
CPC ............ *B01D 53/62* (2013.01); *B01J 20/041* (2013.01); *B01J 20/06* (2013.01); *B01J 20/2803* (2013.01); *B01J 20/3078* (2013.01); *C01B 32/60* (2017.08); *C01B 32/914* (2017.08); *C01F 11/18* (2013.01); *B01D 2251/404* (2013.01); *B01D 2253/1124* (2013.01); *B01D 2255/20738* (2013.01); *B01D 2256/22* (2013.01); *B01D 2257/504* (2013.01); *B01D 2258/0283* (2013.01); *B01D 2259/4525* (2013.01)

(58) Field of Classification Search
None
See application file for complete search history.

(56) References Cited

U.S. PATENT DOCUMENTS

| | | | |
|---|---|---|---|
| 5,040,552 A | 8/1991 | Schleich et al. | |
| 5,509,362 A | 4/1996 | Lyon | |
| 5,827,496 A | 10/1998 | Lyon | |
| 5,855,631 A * | 1/1999 | Leas ..................... | C10J 3/00 48/77 |
| 6,007,699 A | 12/1999 | Cole | |
| 6,387,337 B1 | 5/2002 | Pennline et al. | |
| 6,667,022 B2 | 12/2003 | Cole | |
| 6,911,057 B2 | 6/2005 | Lyon | |
| 7,618,606 B2 | 11/2009 | Fan et al. | |
| 7,780,749 B2 | 8/2010 | Kulkarni et al. | |
| 2002/0037246 A1 | 3/2002 | Beal et al. | |
| 2003/0035770 A1 | 2/2003 | Cole | |
| 2007/0124997 A1 | 6/2007 | Liu et al. | |
| 2008/0083668 A1 | 4/2008 | Caiozza | |
| 2011/0117004 A1 | 5/2011 | Lamont et al. | |
| 2012/0230897 A1 | 9/2012 | Abanades Garcia et al. | |

FOREIGN PATENT DOCUMENTS

| | | |
|---|---|---|
| AU | 2003216925 A1 | 10/2003 |
| AU | 2008282807 A1 | 2/2009 |
| AU | 2015202289 A1 | 12/2015 |
| CA | 2745987 A1 | 1/2013 |
| CA | 2837796 A1 | 2/2013 |
| EP | 1887852 A1 | 2/2008 |
| EP | 2305366 A1 | 4/2011 |
| EP | 2514516 A1 | 10/2011 |
| EP | 2515037 A1 | 10/2012 |

(Continued)

OTHER PUBLICATIONS

International Searching Authority, International Search Report and Written Opinion dated Jun. 8, 2018, in connection with International Application No. PCT/NZ2018/050026, 5 pages.

(Continued)

*Primary Examiner* — Sheng H Davis
(74) *Attorney, Agent, or Firm* — Lee Sullivan Shea & Smith LLP (57) ABSTRACT

This invention describes a method and apparatus for the capture, storage and release of carbon dioxide for use in the horticulture industry, the method including reduction of a transition metal oxide to form a transition metal and carbon dioxide; carburization or partial carburization of the transition metal to form metal carbide; carbonation of an alkaline metal oxide or alkaline earth metal oxide to form an alkaline metal carbonate or alkaline earth metal carbonate; contacting the metal carbide with air to produce a transition metal oxide and carbon dioxide; and calcining the alkaline metal carbonate or alkaline earth metal carbonate to form carbon dioxide and alkaline metal oxide or alkaline earth metal oxide. Also described is a sorbent material for use in the method and apparatus of the invention.

11 Claims, 8 Drawing Sheets

(56) References Cited

FOREIGN PATENT DOCUMENTS

ES 2547465 A1 10/2015
WO 2011/082448 A1 7/2011

OTHER PUBLICATIONS

Supplementary European Search Report, European Patent Application No. 18764819, dated Nov. 18, 2020, 2 pages.
Galvita, Vladimir et al., "Combined Chemical Looping for Energy Storage and Conversion", Journal of Power Sources, vol. 286, Mar. 31, 2015, pp. 362-370.

* cited by examiner

METHOD AND APPARATUS FOR CARBON DIOXIDE CAPTURE AND RELEASE

CROSS REFERENCE TO RELATED APPLICATIONS

This application is a national stage application under 35 U.S.C. § 371 of International Application No. PCT/NZ2018/050026, filed Mar. 9, 2018, which claims the benefit of priority from New Zealand Application No. 729897, filed Mar. 9, 2017. The disclosures of all of the above applications are incorporated by reference herein in their entireties.

FIELD OF INVENTION

The invention described herein relates to an improved method for recovering clean carbon dioxide from a fuel stream, storing and releasing the carbon dioxide for use as required. The invention is particularly useful on a small to medium scale where clean carbon dioxide is required for horticultural, uses.

BACKGROUND TO THE INVENTION

Methods for the capture and release or storage of carbon dioxide ($CO_2$) have been around for a number of decades using various methodologies. Typically, the methods currently utilised and in development are focussed on removing $CO_2$ from natural gas (sweetening) and from power plant exhaust gases which require the recovery of pure $CO_2$ for sequestration at very large scales (~450 ton/day).

The majority of current approaches use a material (amines, enzymes, mineral carbonates) that reversibly binds $CO_2$ to achieve the separation. The material is cyclically contacted with the target gas to capture $CO_2$ and then moved to another vessel where the release of $CO_2$ is triggered. One such family of systems is called Calcium Looping (CaL). In these systems, a $CO_2$ containing gas is reacted with lime (CaO) in a first reactor to form limestone ($CaCO_3$) which is in turn calcined in a second step to release $CO_2$ and regenerate CaO thus completing the cycle which is then repeated.

The use of lime as a sorbent is hugely attractive for $CO_2$ capture due to its low cost, very high $CO_2$ capacity at ≈300 $kgCO_2/tCaO$, as well as high temperature operation which allows minimisation of energy costs. Due to these advantages, it is considered as one of the most promising $CO_2$ capture systems currently available.

However, the energy of reactions involved in this system are high and although they are fully recoverable, they present several difficulties that the present invention is able to solve.

Firstly, the need to supply/evacuate large amounts of heat from the material have so far limited the applications of the process to the use of fluid beds which have excellent heat transfer properties but are difficult to operate and therefore only economical at very large, power plant scales.

Secondly, the heat required for $CO_2$ release must be supplied to the solid without compromising the purity of the $CO_2$ released which is difficult and expensive to achieve in practice.

Known methods for $CO_2$ capture also include the use of metal oxides that can be cyclically oxidized and reduced in a controlled manner to provide a reservoir of oxygen sufficient for oxidation of a fuel. Such combustion systems, referred to as chemical looping combustion (CLC), contain metal oxides with which fuel can be oxidized without being mixed with air, which in turn controls emissions of $CO_2$ and other potentially harmful gases.

CLC systems have been proposed as a solution to the second problem mentioned above, namely how to supply heat for the CaL calcination reaction without compromising the purity of the $CO_2$ produced. In this configuration, the CLC and CaL reactions can be arranged so that the heat released from the CLC reactions can supply the necessary heat for releasing $CO_2$ from the CaL loop.

While these methods are in theory capable of recovering pure $CO_2$ from a wide range of sources such as flue gases from factories or power plants, they typically require large reactor systems in order to achieve the desired recovery of pure $CO_2$.

In contrast to the large scale carbon capture described above which recovers pure $CO_2$, the greenhouse industry only requires recovering clean $CO_2$ to feed plants at a much smaller scale (~3 ton/day).

Pure $CO_2$ is typically defined as being nearly 100% $CO_2$, as required by the geological sequestration process or other utilisation schemes. In contrast, for its use in greenhouse horticulture the $CO_2$ needs to be clean i.e. not mixed with components that could be toxic to plants and sufficiently concentrated to be practically usable in the greenhouse, which is typically >5-10% $CO_2$.

In the horticultural industry, $CO_2$ enrichment in a greenhouse environment is used to increase plant production, by increasing rates of photosynthesis in the enclosed space. $CO_2$ is commonly delivered to greenhouses using a variety of methods, including direct $CO_2$ enrichment from pre-purchased compressed $CO_2$ gas; burning of clean-burning fuels such as propane, butane, alcohol or natural gas, by using dry ice, fermentation or decomposition methods that expel $CO_2$ during the process.

These known methods are more suited to small scale greenhouse operations, and require regular maintenance and purchase of fuel such as gas for burning, dry ice, or sugar for example for a fermentation system. However, suitable fuels are typically very expensive.

It would be advantageous to provide a method and apparatus for the capture, storage and controlled release of $CO_2$ that is suitable for a small-medium scale operation, that has the economic and environmental advantages of using industry derived waste as a fuel source, while still being of a small enough scale that is can be implemented and effectively used in a small to medium greenhouse operation.

OBJECT OF THE INVENTION

It is an object of the invention to provide an improved process or method to capture and/or, store and/or release of clean $CO_2$.

Alternatively, it is an object of the invention to provide an improved apparatus to capture and/or store and/or release of clean $CO_2$ for use in the horticultural industry.

Alternatively, it is an object of the invention to at least provide the public with a useful choice.

SUMMARY OF THE INVENTION

According to a first aspect of the invention there is provided a method for the capture and storage of carbon dioxide, the method including carburization or partial carburization of a transition metal oxide with a reducing gas to produce carbon dioxide, and carbonation of an alkaline metal oxide or alkaline earth metal oxide with said carbon dioxide to form a carbonate.

According to a second aspect of the invention, there is provided a method for the capture and storage of carbon dioxide, the method including the steps of:
a) contacting a heated gaseous fuel stream with a transition metal oxide;
b) reducing the transition metal oxide to form a transition metal and carbon dioxide;
c) carburizing or partially carburizing the transition metal to form metal carbide;
d) contacting the carbon dioxide with an alkaline metal oxide or alkaline earth metal oxide to form an alkaline metal carbonate or alkaline earth metal carbonate.

In further preferred aspects of the invention, the method includes the preliminary step of creating a heated gaseous fuel stream by mixing the fuel stream with air.

Preferably, the method for storage and capture of carbon dioxide further includes a step of carbon dioxide release, the carbon dioxide release step including;
e) contacting the metal carbide formed in step c) with air to produce a transition metal oxide and carbon dioxide;
f) calcining the metal carbonate of step d) to form carbon dioxide and alkaline metal oxide or alkaline earth metal oxide.

In preferred embodiments the gaseous fuel stream is selected from a carbonaceous gas, such as a hydrocarbon or carbon monoxide; a product of partial oxidation of carbonaceous fuels such as volatile pyrolysis products, tars, oils; or hydrogen, ammonia, hydrogen sulphide.

In preferred embodiments of the invention the heated fuel stream at step a) is between 500-900° C. More preferably, the fuel stream has a temperature of approximately 700° C.

Preferably, the transition metal used is selected from iron, nickel, manganese, copper or cobalt or a mixture thereof. In more preferred forms of the invention the transition metal is iron.

Preferably, the alkaline metal oxide or alkaline earth metal oxide is calcium oxide, magnesium oxide or lithium oxide or a mixture thereof. In more preferred forms of the invention the alkaline earth metal oxide is calcium oxide.

Preferably, the fuel stream is contacted with a transition metal oxide and alkaline metal oxide or alkaline earth metal oxide substantially simultaneously. More preferably, the transition metal oxide and alkaline earth metal oxide are combined in a composite sorbent material.

Preferably, the method as described in steps a) to d) is conducted within the temperature range of 600-800° C.

Preferably, the rate of release of carbon dioxide at steps e) and f) is controlled by the rate of contact between the transition metal carbide and air.

Preferably, the method as described in steps e) to f) is conducted within the temperature range of 700-900° C.

In alternative embodiments of the invention step e) of carbon dioxide release includes the step of additionally contacting the transition metal carbide with a fuel gas to reduce the amount of transition metal carbide required in the release of $CO_2$.

In further alternative embodiments of the invention, the carburization step is only partially completed and the metal oxide is reduced to a mixture of metal carbide and metal or a lower oxidation level metal oxide, which is then contacted with air in step e).

More preferably, the method includes the use of a composite sorbent material comprising at least a transition metal oxide and an alkaline earth metal oxide and the step of forming a metal carbide is completed or partially completed such that the carbon deposition of the composite sorbent material is always below a carbon/iron molar ratio of 0.9.

More preferably, the carbon deposition of the composite sorbent material is always below a carbon/iron ratio of 0.6.

According to a further embodiment of the invention, there is provided an apparatus for the capture and storage of carbon dioxide, the apparatus including:
a) a means for receiving a heated gaseous fuel stream
b) a means for contacting the heated fuel stream with a transition metal oxide to form a transition metal, metal carbide or mixture of metal carbide and metal or a lower oxidation level metal oxide, and carbon dioxide;
c) a means for contacting the carbon dioxide with an alkaline metal oxide or alkaline earth metal oxide to form an alkaline metal carbonate or alkaline earth metal carbonate.

According to a further embodiment of the invention, there is provided an apparatus for the capture and storage of carbon dioxide, the apparatus including:
a) a means for receiving a heated gaseous fuel stream;
b) a means for contacting the heated fuel stream with a transition metal oxide to facilitate reduction of the transition metal oxide to form a transition metal, and carburization or partial carburization of the transition metal to form a transition metal carbide and carbon dioxide;
c) a means for contacting the carbon dioxide with an alkaline metal oxide or alkaline earth metal oxide to form an alkaline metal carbonate or an alkaline earth metal carbonate.

In preferred embodiments, the apparatus further includes a means for controlling the temperature of the gaseous fuel stream.

In preferred embodiments the apparatus further includes a means for controlling the carburization potential of the gaseous fuel stream, wherein the means for controlling carburization potential is selected from one or more additional gas inlets, water/oil evaporators, mixing devices or combinations thereof.

In further preferred aspects of the invention, the apparatus further includes a means for creating a heated gaseous fuel stream by mixing the gaseous fuel stream gas with air.

Preferably, the apparatus for storage and capture of carbon dioxide further includes a means for carbon dioxide release, the means for carbon dioxide release further including;
a means for receiving a stream of air;
a means for contacting the transition metal carbide with air to facilitate production of a transition metal oxide and carbon dioxide, and calcination of the metal carbonate to form carbon dioxide and an alkaline earth metal oxide; and
a means for discharging carbon dioxide to the external environment.

In preferred embodiments, the apparatus further includes a means for controlling the temperature of the air stream.

In preferred embodiments the apparatus includes one or more fixed bed reactors, more preferably, one or more fixed bed, batch reactors.

Alternatively, the apparatus includes a falling, moving or fluid bed reactor.

In further preferred embodiments, the reactor includes three fluidly connected functional zones.

Preferably, the three functional zones include a burner zone for mixing and heating the fuel stream, a reaction zone for reduction and carburization of the transition metal and oxidation of the alkaline earth metal oxide, and a heat recovery zone.

In preferred embodiments where the apparatus includes two or more reactors, the reactors may be fluidly connected together and with a source of reducing gas to allow a sequential capture and release of carbon dioxide between the two reactors.

According to a further aspect of the invention there is provided the use of an apparatus for the capture and storage of carbon dioxide, the apparatus including:
- a means for receiving a heated gaseous fuel stream;
- a means for contacting the heated fuel stream with a transition metal oxide to facilitate reduction of the transition metal oxide to form a transition metal, and carburization or partial carburization of the transition metal to form a transition metal carbide and carbon dioxide;
- a means for contacting the carbon dioxide with an alkaline metal oxide or alkaline earth metal oxide to form an alkaline metal carbonate or an alkaline earth metal carbonate;
- for performing a method of carbon capture and storage, the method including the steps of:
  - contacting a heated gaseous fuel stream with a transition metal oxide;
  - reducing the transition metal oxide to form a transition metal and carbon dioxide;
  - carburizing or partially carburizing the transition metal to form metal carbide;
  - contacting the carbon dioxide with an alkaline metal oxide or alkaline earth metal oxide to form an alkaline metal carbonate or alkaline earth metal carbonate.

According to a still further aspect of the invention there is provided the use of an apparatus for the capture, storage and release of carbon dioxide, the apparatus including:
- a means for receiving a heated gaseous fuel stream;
- a means for contacting the heated fuel stream with a transition metal oxide to facilitate reduction of the transition metal oxide to form a transition metal, and carburization or partial carburization of the transition metal to form a transition metal carbide and carbon dioxide;
- a means for contacting the carbon dioxide with an alkaline metal oxide or alkaline earth metal oxide to form an alkaline metal carbonate or an alkaline earth metal carbonate;
- a means for receiving a stream of air;
- a means for contacting the transition metal carbide with air to facilitate production of a transition metal oxide and carbon dioxide, and calcination of the metal carbonate to form carbon dioxide and an alkaline earth metal oxide; and
- a means for discharging carbon dioxide to the external environment;
- for performing a method of carbon capture and storage, the method including the steps of:
  - contacting a heated gaseous fuel stream with a transition metal oxide;
  - reducing the transition metal oxide to form a transition metal and carbon dioxide;
  - carburizing or partially carburizing the transition metal to form metal carbide;
  - contacting the carbon dioxide with an alkaline metal oxide or alkaline earth metal oxide to form an alkaline metal carbonate or alkaline earth metal carbonate;
  - contacting the metal carbide with air to produce a transition metal oxide and carbon dioxide;
  - calcining the metal carbonate to form carbon dioxide and alkaline metal oxide or alkaline earth metal oxide.

According to a further embodiment of the invention there is provided a sorbent material suitable for use with the method and apparatus described above, the sorbent material including a combination, composite or mixture of calcium oxide (CaO) and iron ore ($Fe_2O_3$).

In preferred embodiments the sorbent material includes a molar calcium/iron ratio between 0.3-10. More preferably, this ratio would be higher than 3.

In further preferred embodiments the sorbent material is a pelletized composition of calcium oxide, iron ore and an inorganic binder for example, bentonite.

More preferably, the sorbent material is formed from 50-75% wt. calcium oxide, 15%-40% wt. iron ore and 5%-15% wt. of an inorganic binder selected from one or more of the following groups: alumina silicate, Portland cement, calcium aluminate cements, calcium hydroxide, sodium silicate, bentonite or clays. Even more preferably, the sorbent material is formed from approximately 60% wt. calcium oxide, 30% wt. iron ore and 10% wt. inorganic binder(s).

Preferably, the sorbent material has a porosity of at least 20%.

In further optional embodiments, the sorbent material includes one or more organic binders.

More preferably, the organic binder is selected from one or more of the following groups; polyvinyl alcohols, starches, dextrin, cellulose polymers, polyethylene glycols, lignosulfonates, bitumen, paraffins, wax emulsions and polyacrilates.

More preferably, the proportion of organic binder is between 0.1-20% of the pellet mass before firing.

According to a further aspect of the invention there is provided the use of the sorbent material as described above with the apparatus of the present invention as described above.

According to a still further aspect of the invention, there is provided the use of the sorbent material as described above in the method of carbon dioxide capture, storage and/or release as described above.

For the purposes of this specification the term "gaseous fuel stream" should be taken to mean any combustible gas or mixture of gases containing a proportion of carbon in any form.

Further aspects of the invention, which should be considered in all its novel aspects, will become apparent to those skilled in the art upon reading of the following description which provides at least one example of a practical application of the invention.

DESCRIPTION OF THE DRAWINGS

One or more embodiments of the invention will be described below by way of example only, and without intending to be limiting, with reference to the following drawings, in which.

DETAILED DESCRIPTION OF PREFERRED EMBODIMENTS OF THE INVENTION

Access to clean, cheap and renewable $CO_2$ is a significant issue in the horticulture industry. The combustion of biomass fuels, especially low grade, has the potential to provide large amounts of $CO_2$ at low cost. However, $CO_2$ must be separated from the flue gas as the latter contains a number of undesirable compounds which can be harmful to plants, for example tars, particles, hydrocarbons (ethylene), mono-nitrogen oxides (NOx), sulphur oxides (SOx) and hydrogen chlorine (HCl).

The method and apparatus disclosed herein provides a means for separating clean $CO_2$ from a gas stream, storing the $CO_2$ and releasing stored $CO_2$ into the environment in a controlled manner.

The method utilised in the present invention focusses on the cyclical carburization/oxidation of a transition metal and carbonation/calcination of an alkaline earth metal through a series of auto-thermal reaction steps. This is in contrast to known technologies, where oxidation of transition metals is typically used to recover pure $CO_2$ from the combustion of fuels and which typically take steps to actively avoid carbon deposition and carburization of transition metal.

The method and apparatus of the present invention is particularly suited to small-medium scale operations, particularly in the horticulture industry, where the application of $CO_2$ to greenhouses can significantly increase plant growth and yield.

The processes described below include the use of a transitional metal and an alkaline metal oxide or alkaline earth metal oxide. For the purposes of the description the transition metal exemplified will be iron and the alkaline earth metal calcium. While these particular metals are well suited to the process, this is not intended to be limiting. Transition metals such as nickel, manganese, copper and cobalt may also be used or mixed with iron in varying embodiments of the invention. Likewise, calcium oxide may be replaced or mixed with magnesium, sodium, potassium, beryllium or lithium oxide.

Iron is particularly useful in the method of the present invention as it is low cost, easily carburized and releases a significant amount of heat during oxidation.

Figure 1:
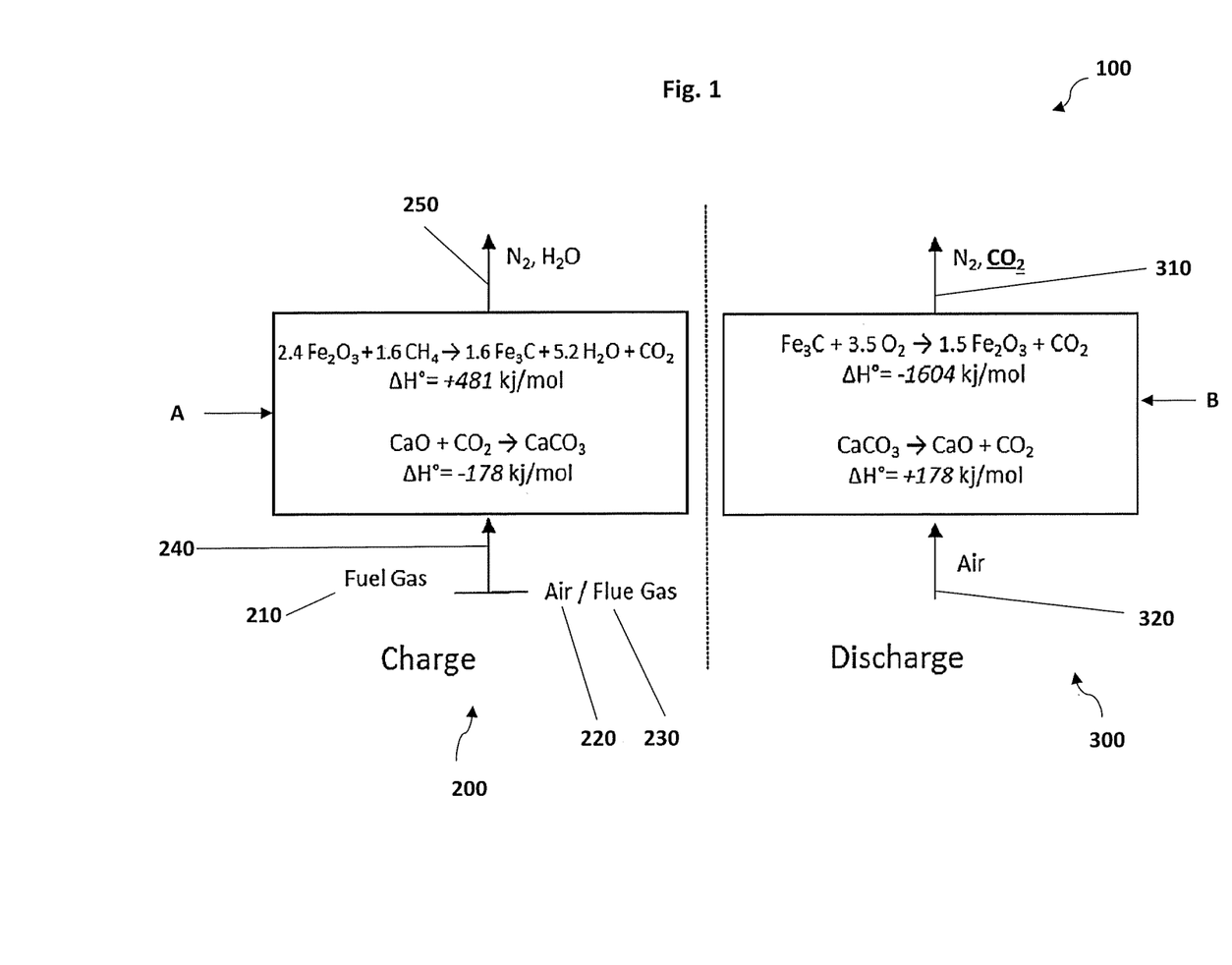
FIG. 1 shows an overview of the chemical reactions associated with the capture and release of carbon dioxide in one embodiment of the invention.

The method of the present invention is summarised in FIG. 1, which shows overall method 100 in two distinct steps, including the capture and storage (or charge) phase 200 in reactor A and the release, or discharge phase 300 in reactor B. The separation of the method into two distinct reactors is not intended to be limiting, but is for explanation purposes. In practice the method may occur in either a single reactor, or multiple reactors.

Figure 8:
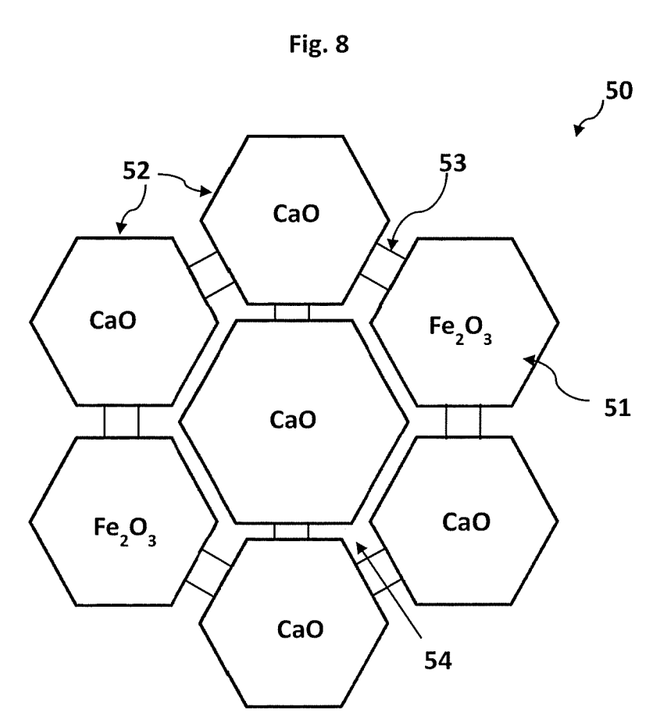
FIG. 8 shows a diagrammatic representation of one embodiment of the sorbent material of the present invention.

In this example, the method uses two solid materials to achieve the required reactions calcium oxide (CaO) and iron oxide ($Fe_2O_3$). These materials are preferably incorporated into a composite material, which is described in further detail below and may be referred to as a "sorbent material" for the purposes of this specification. A diagrammatic example of the sorbent material 50 in one possible embodiment is shown in FIG. 8. In this example, the sorbent material 50 has a porous structure and consists of predominantly CaO (52) and $Fe_2O_3$ (51), together with an organic or inorganic binder 53. The pores within the structure are indicated at 54.

During the first step in charge phase 200, a reducing gas (for example $CH_4$) 210 is optionally mixed with a small proportion of air 220 to increase its temperature and optionally some flue gas 230 to increase the amount of $CO_2$, then heated to produce heated fuel stream 240 and contacted with the $Fe_2O_3$ and CaO materials present in reactor A.

Fuel stream 240 contacts the $Fe_2O_3$ component of the sorbent material present in the reactor, reducing the $Fe_2O_3$ to a metallic iron and then carburizing it to form iron carbide, releasing $CO_2$ as a product. $CO_2$ is in turn captured by CaO component of the material, forming calcium carbonate.

Unwanted nitrogen gas, water and hydrogen produced during the reaction are released 250 from the reaction system.

The charging process 200 proceeds in a series of steps via a number of intermediary iron oxides in reactor A. In addition, a significant number of gas reactions take place, making the chemical reaction system in play a complex one, as shown in the table below:

| Reforming/WGS | Metal Reduction | Carburization | Carbonation |
|---|---|---|---|
| $CH_4 + \begin{vmatrix} H_2O \\ CO_2 \end{vmatrix} \leftrightarrow CO + H_2$ | $Fe_2O_3 + \begin{vmatrix} CH_4 \\ H_2 \\ CO \end{vmatrix} \leftrightarrow Fe_3O_4 + CO_2 + H_2O$ | $CO + \begin{vmatrix} CO \\ H_2 \end{vmatrix} \leftrightarrow C + CO_2 + H_2O$ | $CaO + CO_2 \leftrightarrow CaCO_3$ |
| $C + \begin{vmatrix} H_2O \\ CO_2 \end{vmatrix} \leftrightarrow CO + H_2$ | $Fe_3O_4 + \begin{vmatrix} CH_4 \\ H_2 \\ CO \end{vmatrix} \leftrightarrow FeO_x + CO_2 + H_2O$ | $3Fe + C \leftrightarrow Fe3C$ | |
| $CO + H_2O \leftrightarrow H_2 + CO_2$ | $FeO_x + \begin{vmatrix} CH_4 \\ H_2 \\ CO \end{vmatrix} \leftrightarrow Fe + CO_2 + H_2O$ | | |

Carbonation is the primary route for the capture and storage of $CO_2$ which is removed from the fuel stream. As a result the advancement of metal reduction, water-gas shift (WGS) and carbon deposition reactions is thermodynamically favoured, as $CO_2$ is continuously removed from reactor A. In addition, the heat produced by the carbonation reaction drives the endothermic reactions e.g. reforming and metal reduction.

Metal Reduction proceeds in a series of steps via a number of stable intermediary oxides:

$$Fe_2O_3 \leftrightarrow Fe_3O_4 \leftrightarrow FeOx \leftrightarrow Fe$$

To move these reactions to the right, the reduction potential of the inlet gas must be sufficiently high with each further step requiring a higher threshold level. As with the WGS and carbon deposition reactions, in-situ removal of $CO_2$ significantly lowers these thresholds thus greatly facilitating operation.

Carburization starts occurring once reduction is complete and metallic iron (Fe) is formed. This reaction proceeds via assimilation of surface carbon deposits into the metal matrix until a stable $Fe_3C$ phase forms.

As a result, deposits of elemental carbon are formed in parallel with the formation of iron carbide ($Fe_3C$) and the exact ratio of carbon atoms in these two forms (C vs. $Fe_3C$) depends on a very large variety of gas and solid parameters.

This means that, in most cases, it can be expected that a significant amount of deposited elemental carbon will be present alongside the metal carbide. However, the reverse is not necessarily true i.e. it is possible to deposit carbon without forming a metal carbide.

From the overall process point of view, there is little difference between carbon stored in the metal matrix in the form of $Fe_3C$ and the elemental carbon deposited on the metal surfaces as both will yield clean $CO_2$ when contacted with air.

However, from the material perspective $Fe_3C$ is preferable as an excess of carbon deposits may lead to reduced mechanical strength of the sorbent material and may impede the flow of gas through the reaction bed.

For this reason, in some cases it may be preferable to limit the amount of carburization of the metal in order to limit the accompanying carbon deposition and perform only a partial carburization of the metal component.

This is best illustrated with experimental results obtained during cycling experiments of composite limestone/iron pellets (Ca/Fe ratio at 3.25). As can be seen in the table, high levels of carbon deposition (here expressed as a molar carbon/iron ratio) correlate with weakened pellets.

| Number of cycles | Average Carbon deposition (C/Fe ratio) | Max. Carbon deposition (C/Fe Ratio) | Pellet Strength |
|---|---|---|---|
| 13 | 0.84 | 1.65 | Pulverized |
| 13 | 0.29 | 1.04 | Broken |
| 13 | 0.29 | 0.34 | Strong |
| 55 | 0.23 | 0.52 | Strong |

These results indicate that pellets are particularly sensitive to the maximum carbon deposition level achieved during cycling. The exact amount of carbon deposition which triggers the breakage of sorbent material varies with the formulation and preparation method used.

In the case of the pellets used in the above experiments pellet breakage began once carbon deposition reached a C/Fe ratio of 0.52. Across a range of pellet formulations carbon deposition should be preferably restricted to a C/Fe ratio below 0.9, or more preferably, less than 0.6 Partial carburization is particularly useful for recovering $CO_2$ from weakly reducing fuel gases, which may not have sufficient reducing potential to lead to the full conversion to metal carbide.

Unlike most processes described in the literature, which teach away from the deposition of carbon, in the present invention carbon deposition and carburization of the metal are useful as they present a further method of storing and capturing $CO_2$.

The Reforming/WGS reactions convert fuel gas (here $CH_4$) into mixtures of $CO/H_2$ which affect the process in several ways. On one hand, the reduction of metals is significantly faster with small molecules than larger ones ($H_2 > CO > CH_4 > C_nH_x$) so that good advancement of the reforming reaction will increase the kinetics of the reduction reaction. However, the advancement of the reforming reactions also affects the carbon deposition and carburization reactions by gasifying carbon deposits present at the solid surfaces.

The table below shows an example reaction system during charge for a range of fuel gas streams (any type of hydrocarbon, here written as $C_nH_yO_x$); nickel, copper and manganese oxides and alkaline earth oxides selected from calcium, magnesium and lithium. The reaction system may utilise any metal oxides and alkaline earth oxides, or combinations thereof in a single system.

| Reforming/WGS | Metal Reduction | Carburization | Carbonation |
|---|---|---|---|
| $C_nH_yO_x + \begin{vmatrix} H_2O \\ CO_2 \end{vmatrix} \leftrightarrow CO + H_2$ | $NiO + \begin{vmatrix} CH_4 \\ H_2 \\ CO \end{vmatrix} \leftrightarrow Ni + CO_2 + H_2O$ | $CO + \begin{vmatrix} CO \\ H_2 \end{vmatrix} \leftrightarrow C + CO_2 + H_2O$ | $CaO + CO_2 \leftrightarrow CaCO_3$<br>$Li_2O + CO_2 \leftrightarrow Li_2CO_3$<br>$MgO + CO_2 \leftrightarrow MgCO_3$ |
| $C + \begin{vmatrix} H_2O \\ CO_2 \end{vmatrix} \leftrightarrow CO + H_2$ | $CuO + \begin{vmatrix} CH_4 \\ H_2 \\ CO \end{vmatrix} \leftrightarrow Cu + CO_2 + H_2O$ | $3Ni + C \leftrightarrow Ni_3C$<br>$3Mn + C \leftrightarrow Mn_3C$<br>$2Cu + 2C \leftrightarrow Cu2C2$ | |
| $CO + H_2O \leftrightarrow H_2 + CO_2$ | $Mn_2O_3 + \begin{vmatrix} CH_4 \\ H_2 \\ CO \end{vmatrix} \leftrightarrow Mn + CO_2 + H_2O$ | | |

The overall reaction system described above puts in balance a series of exothermic and endothermic reactions and therefore can be made to operate autothermally.

The method to achieve autothermal operation is dependent on the fuel gas stream used for charging and will including controlling entry temperature of the gas stream, selecting an appropriate Ca:Fe ratio and amount of inert material in the pellets, as well as the addition of catalysts in the material if required.

Figure 3:
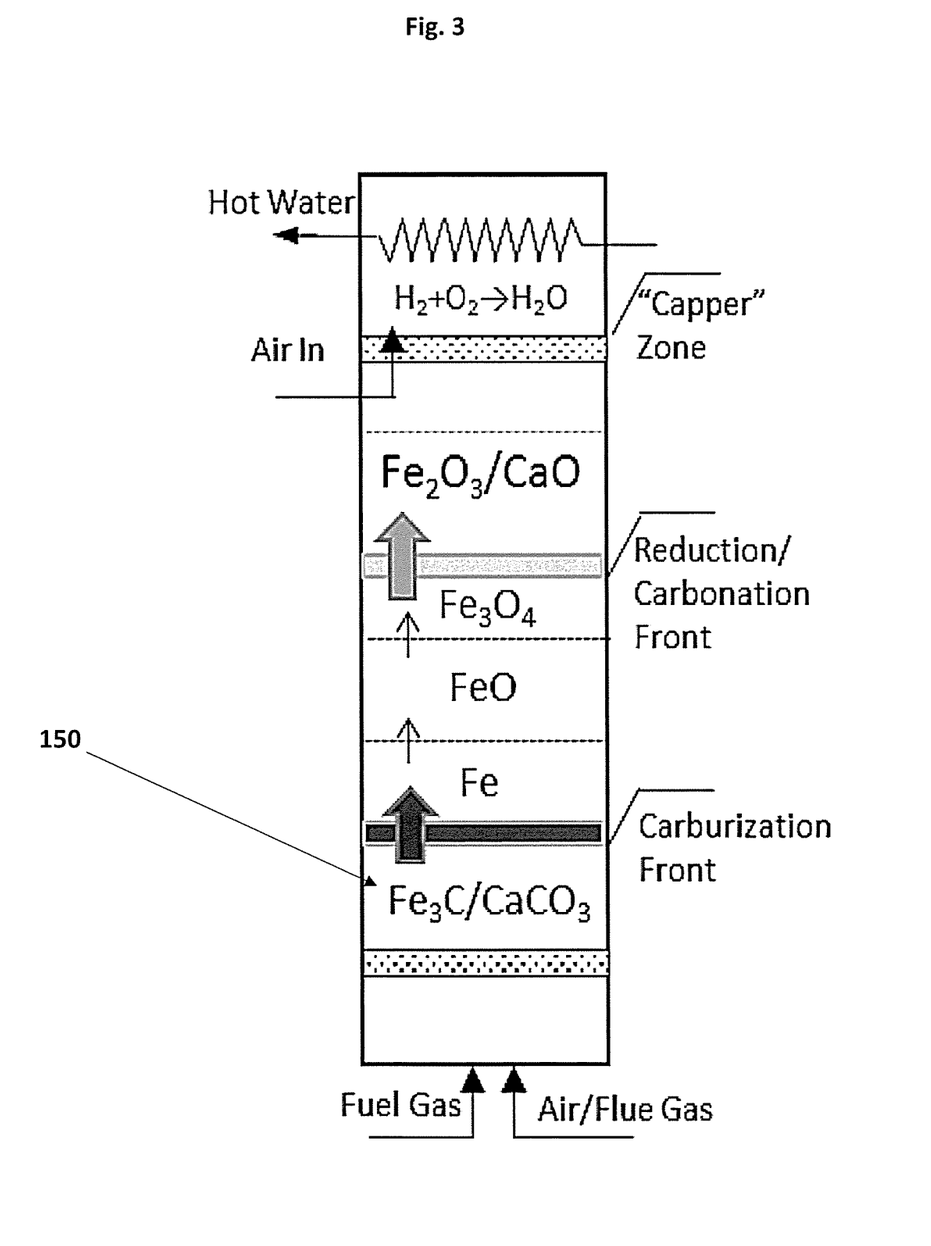
FIG. 3 shows an apparatus in one embodiment of the invention for the capture and storage carbon dioxide from a fuel stream.
Figure 6:
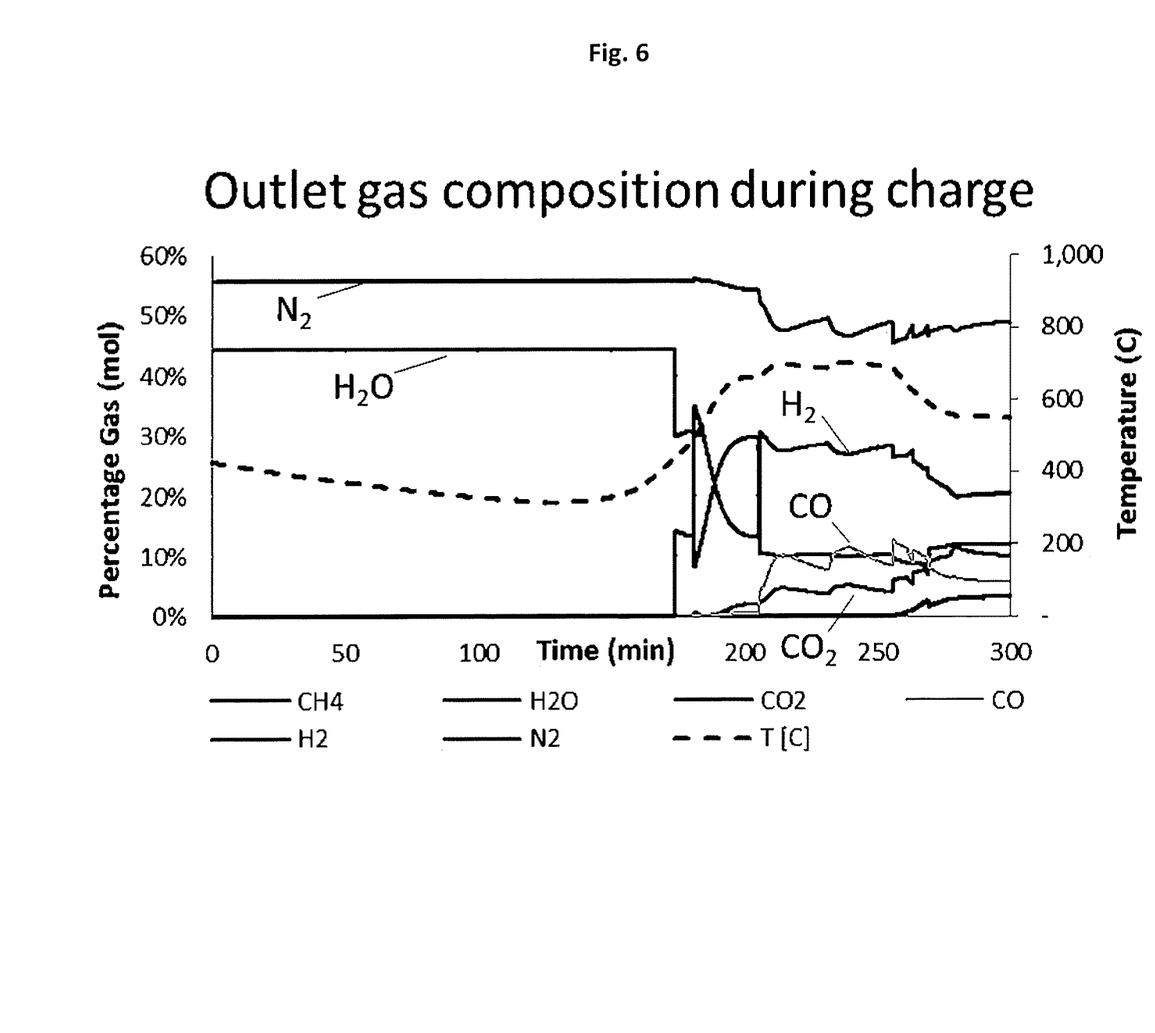
FIG. 6 shows a graph of the temperature and composition of gas leaving the reactor following the charge phase.

The ability of the system to maintain autothermal operation is illustrated in FIG. 6 which represents the temperature and composition of the gas leaving a reactor such as shown in FIG. 3. This data was calculated using a dynamic mathematical model in which the bed is divided in multiple layers for which the model calculates thermochemical equilibria and heat and mass balances. For this calculation the charge gas was a typical wood-derived syngas supplied at 427° C. and with a residence time of 10s while the sorbent was a mixture of $Fe_2O_3$ and $CaCO_3$ with a Ca:Fe ratio of 3.25.

As seen in this figure, during the first ≈170 minutes only steam ($H_2O$) and nitrogen are leaving the reaction zone (before the "capper" zone) indicating that all the reducing gases have been consumed by the iron component and that all the $CO_2$ generated is being absorbed by the lime component in the bed.

At ≈150 min, the temperature of the outlet gas (which is identical to that of the top-most layer of material in the reactor) starts increasing indicating that $CO_2$ capture is taking place in the top-most layer of the bed. Note that this temperature stabilises at approx. 715° C. as a result of the balance between the exothermic carbonation of lime and the endothermic reduction of iron.

During this phase, at ≈170 minutes, hydrogen ($H_2$) starts breaking through indicating that the reduction reaction has reached its maximum. Note that the spikes observed in the gas composition curves are due to the coarse calculation methods used in this work.

At ≈180 min some $CO_2$ begins breaking through from the bed, indicating that the top-most layer of the reactor is near fully charged in $CO_2$ and at ≈270 min it reaches its maximum level while the temperature reduces suggesting that the bed is fully charged with CO2.

Following capture and storage of carbon dioxide as calcium carbonate, the release of $CO_2$ into the atmosphere or greenhouse can be performed at a controlled rate using the reaction system shown in FIG. 1 in reactor B.

When carbon dioxide is required, $CO_2$ is released 310 from reactor B by contacting the $Fe_3C/CaCO_3$ mixture resulting from the charging phase 200 with oxygen ($O_2$) from the air 320. Contact with oxygen at temperatures >200° C. triggers the oxidation of iron carbide back to $Fe_2O_3$ (hematite) which releases $CO_2$ as well as large amount of heat.

This heat is in turn consumed by the calcination of limestone ($CaCO_3$) at temperatures >700° C. which leads to further release of $CO_2$. As only air is introduced in the reactor to trigger the release of $CO_2$, it can be expected that the $CO_2$ produced in this way would mix only with air constituents and therefore is guaranteed to be clean enough for use in a glasshouse environment without being detrimental to plant health.

Similarly to the charging phase 200, the simultaneous occurrence of an endothermic and exothermic reaction during discharge phase 300 would result in a thermal balance within the reactor and avoid any overheating of the system. As a result, the rate of release of $CO_2$ can be simply controlled by the rate of supply of $O_2$ into the system.

Figure 4:
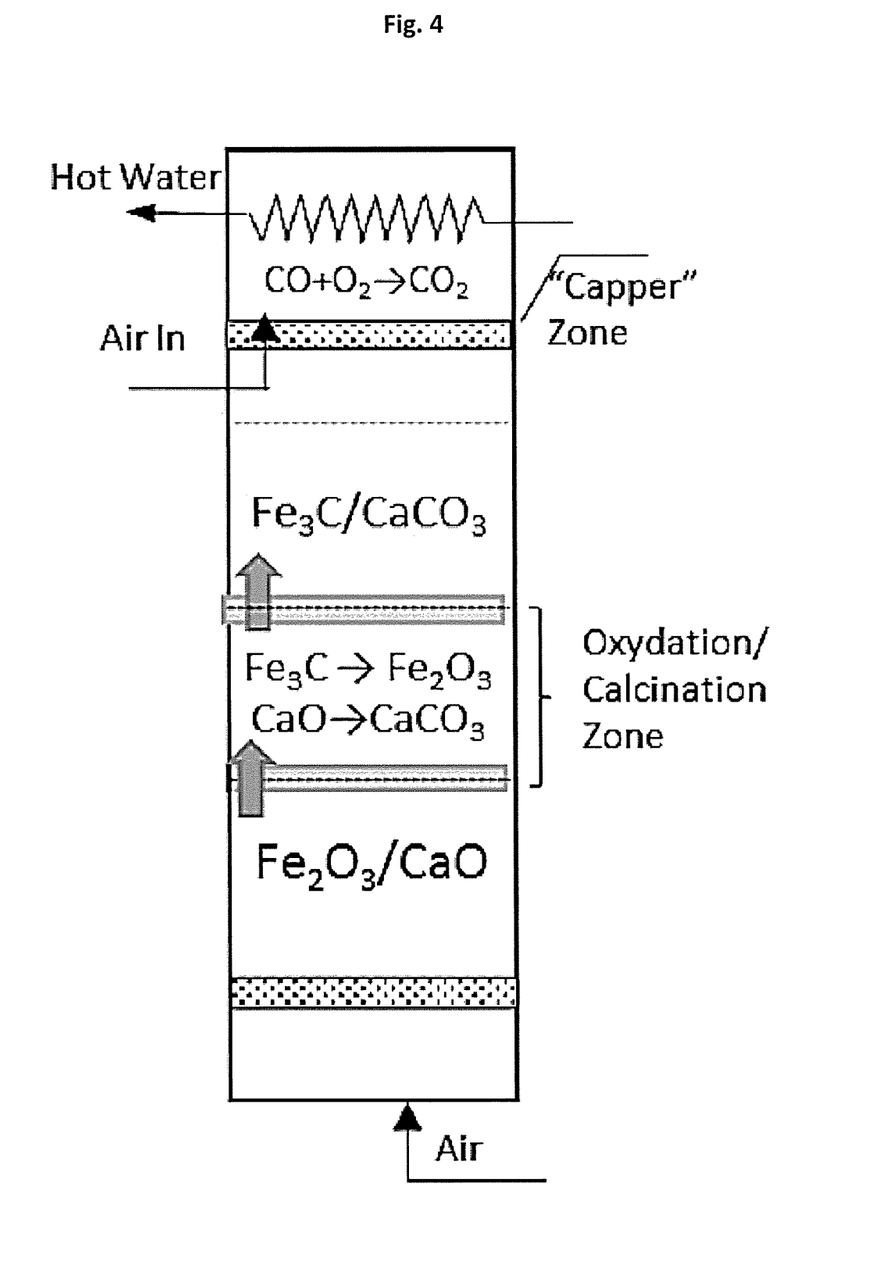
FIG. 4 shows an apparatus in one embodiment of the invention for the release of stored carbon dioxide into the environment.
Figure 7:
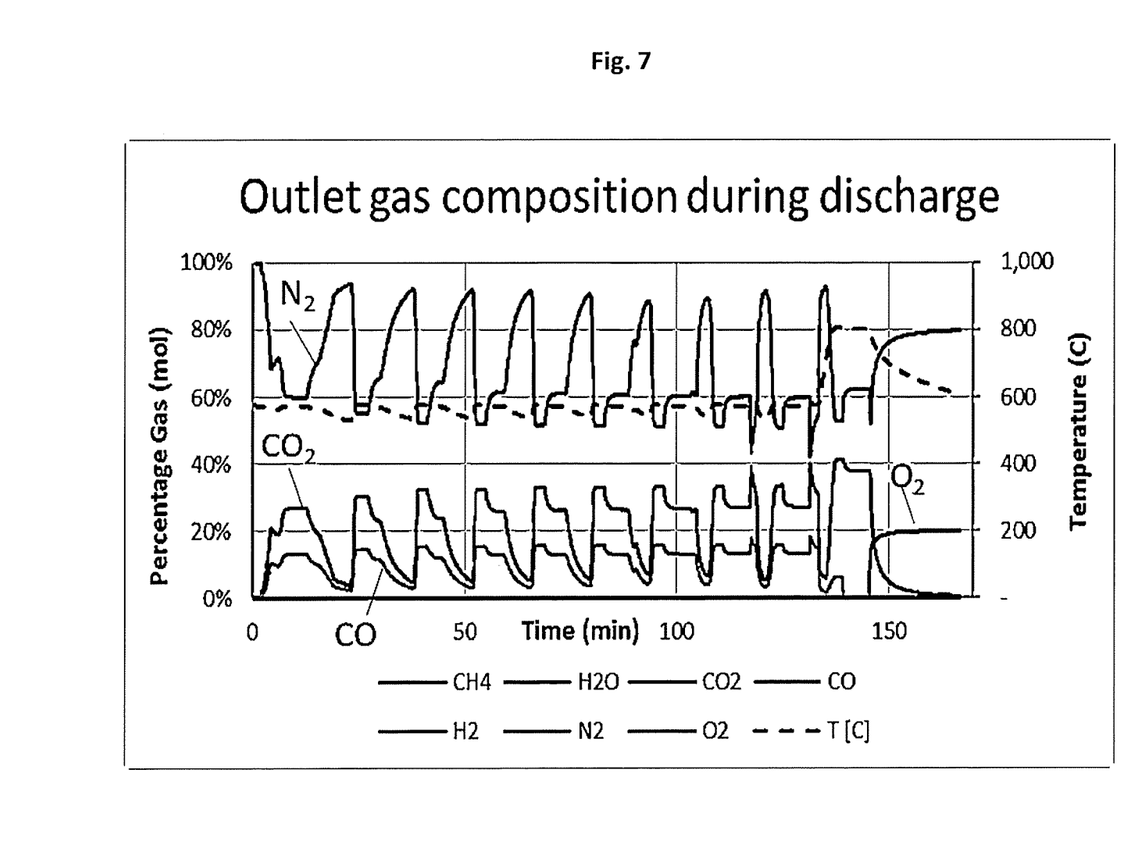
FIG. 7 shows a graph of the temperature and composition of gas leaving the reactor following the discharge phase.

The ability of the system to produce clean $CO_2$ in contact with air while maintaining a steady temperature is illustrated in FIG. 7 which shows the composition of the outlet gas leaving a reactor such as that in FIG. 4 during the discharge phase, as calculated using a dynamic mathematical model. For this calculation the discharge air was supplied at 600° C.

As can be seen in FIG. 7, throughout the whole discharging phase, the gas leaving the reaction zone (before the "capper" zone) is composed essentially of ≈80% $N_2$, 15% $CO_2$ and 5% CO. The "sawtooth" aspect of the curves is naturally due to the coarse methods of calculation and each tooth corresponds to the discharge of a virtual layers used for calculation. In reality, these curves will not exhibit such discontinuities.

The temperature of the outlet gas (which is identical to that of the top-most layer of material in the reactor) remains stable until about min. 130 when the last layer of material is oxidised as evidenced by a rapid rise in temperature and corresponding release of $CO_2$. Note that the temperature remains stable ≈800° C. during the discharge reaction (mins. 130-145) due to a balance between the exothermic oxidation reaction and the endothermic calcination reactions. At ≈145 min. the bed is fully discharged and the oxygen introduced starts coming out of the bed as can be seen in FIG. 7.

In alternative embodiments, if the sorbent material is charged with a weakly reducing gas, the iron component is only partially carburized or only partially reduced. This leads to a reduction in the quantity of heat released when the charged material is contacted with air but does not prevent discharge, provided a sufficient amount of partially carburized or reduced iron is present to provide the heat required for releasing $CO_2$.

The heat released by the oxidation of iron carbide (or, alternatively, the oxidation of partially carburized and reduced iron) must be sufficient to:
a) increase the temperature of the incoming air to the temperature of calcination;
b) increase the temperature of the solids (limestone, unconverted lime, binders and iron) to the temperature of calcination;
c) provide heat to compensate for heat losses through the walls of the reactor;
d) provide the heat necessary to drive the endothermic calcination reaction.

Based on expected process conditions such as the temperature of incoming air, the starting temperature of the sorbent material as well as the expected conversion of the iron oxide to carburized/reduced iron it is possible to determine the required ratio of iron to calcium in the sorbent material.

The following table provides some guidelines for selecting a Ca:Fe ratio as a function of the expected carbon deposition levels during charge (expressed as a C/Fe ratio) and assuming full reduction, a perfectly adiabatic reactor, incoming air at 20° C., starting temperatures of 600° C. for the solids, 10% binders and only 40% of the lime being active.

| Expected C/Fe ratio | Discharge Capacity $CO_2$/mol Fe | Ca:Fe Ratio |
|---|---|---|
| 0.33 | 3.3 | 5.75 |
| 0.166 | 2.5 | 5 |
| 0 | 1.7 | 4.25 |

The method of the present invention may be performed by a range of different reactor apparatus that may be modified to suit the situation and requirements of the specific user. One example of an apparatus that may be used to implement the method above is a fixed bed reactor 400 shown in FIG. 2.

It is envisaged that the method may be implemented with a range of different apparatus not specifically exemplified here, such as fluid bed, falling bed or moving bed reactors, either using a continuous or batch operation.

A fixed-bed, batch reactor would be particularly suitable for the greenhouse application, as these types of reactor are inexpensive and simple to operate and may be easily transported and installed on an as needed basis by the user.

Figure 2:
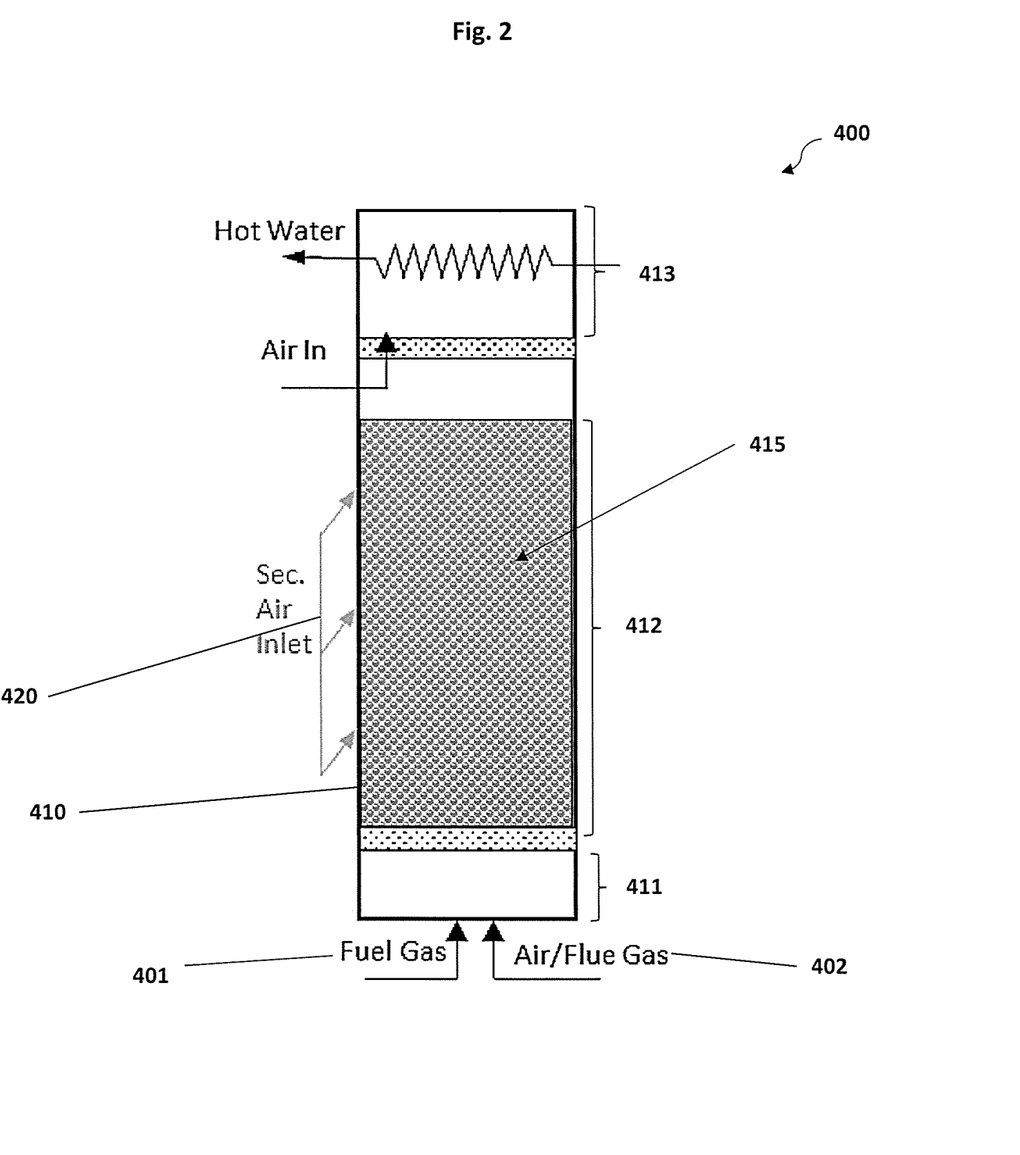
FIG. 2 shows an apparatus in one embodiment of the present invention for the capture and storage of carbon dioxide.

In the apparatus shown in FIG. 2, apparatus 400 includes a single vessel 410. The vessel acts both as a $CO_2$ capture reactor and a $CO_2$ storage unit. In this example vessel 410 has a 2 $m^3$ capacity and is well-insulated.

Vessel 410 is composed of three main functional zones 411, 412 and 413. At the bottom of the vessel is the burner zone 411, where inlet gases are mixed and the fuel gas partly combusted during charge, reaching a temperature of about 700° C.

Inlet gases 401 and 402 are introduced to burner zone 411, mixed and combusted using a gas burner arrangement such as a nozzle or combustion furnace for example. The temperature of the inlet gases may be controlled or maintained at a specific temperature by a controller (not shown). Enabling control of the fuel gas temperature allows for further control over the reaction speed within the reactor.

Once mixed and preheated at zone 411, the gases enter the reaction zone 412 where $CO_2$ capture and release takes place. Several secondary air inlet ports 420 may be added if required to improve control of reactor temperature.

Reaction zone 412 includes a sorbent material 415, in this example a composite $CaO/Fe_2O_3$ material in pellet form. This sorbent material facilitates carbon dioxide capture and release and fills or partially fills reaction zone 412.

The gas leaving reaction zone 412 is typically hot (600-800° C.) and may contain remnants of combustible gases ($H_2$ or CO). This heat can be recovered by combusting this gas with air and passing it over a heat exchanger. This operation may be performed in a zone 413 of the reactor or alternatively in a secondary gas boiler.

By changing the type of gas entering the reactor through the inlet between fuel gas and air, the reactions taking place within the reactor change between capturing and storing (charging) and releasing $CO_2$ (discharging) respectively.

The apparatus may also include means for controlling the carburization potential of the gaseous fuel stream, wherein the means for controlling carburisation potential is selected from the addition of one or more gas inlets, water/oil evaporators, mixing devices or combinations thereof.

These devices allow controlling the carburization potential of the gaseous fuel stream through mixing with additional gases with a higher (e.g. methane) or lower (e.g. steam) carburizing potentials. In turn, the carburizing potential of the gaseous fuel stream controls the extent of carbon deposition and carburization that occurs in the reactor.

The charge and discharge phase of the process is described in more detail below, with reference to FIG. 3 which shows the charge phase when the charging process is approximately halfway through and FIG. 4, which shows the discharge phase, with the discharge phase being approximately half way through.

During the charging phase (FIG. 3) a reducing/carburizing gas mixture (fuel gas, air and/or flue gas) is preheated to ≈700° C. and passed through the bed from the bottom of the reactor until full charge of the sorbent material is reached. The reaction shown in FIG. 3 is partially through the charging phase, and it can be seen that the section indicated by 510 has been fully charged with the reaction front moving upwards through the reactor towards the uncharged $Fe_2O_3$/CaO material at the top of the reactor.

Once in contact with the gas, metal oxide is progressively reduced via the reactions described above and finally carburized, while the resulting $CO_2$ reacts with CaO and is bound as $CaCO_3$ inside the sorbent material. This step-wise reduction and carburization results in the formation of upward moving reactions zones in which these steps take place.

In FIG. 3, the top-most part of the reactor is fully discharged ($Fe_2O_3$/CaO) and acts as a thermal buffer maintaining a constant outlet temperature at 2600-700° C. The heat from the gas and unreacted combustible gases are recovered in the "capper" zone above. The charging of the material may be stopped before all the sorbent material is charged in order to retain a buffer zone within the reactor, or it may continue until all the material is charged.

The reduction of $Fe_2O_3$ with the simultaneous carbonation of CaO is taking place in the middle part of the reactor. As discussed above, due to thermodynamic limitations the metal reaction is expected to proceed in a series of steps via a series of iron oxide intermediates.

As a result, the reduction zone is expected to contain three sub-sections of varying sizes where these oxide intermediates predominate. The carbonation reaction here plays an important role by removing $CO_2$ from the gas phase which thermodynamically favours the reduction reactions and removes limitations typically observed.

The reduction and carburization of the iron consumes large amounts of heat (see FIG. 1) which is supplied by the carbonation of lime (CaO) as well as the partial combustion of the reducing gas (with $O_2$ from air/flue gas) so that the two reactions are in balance and the charging phase is overall thermally neutral.

In the bottom part of the reactor, carburization begins once metallic iron is formed, and the $CO_2$ capture rates become slow due to the diffusion limit. Partial fuel gas reforming also takes place due to the catalytic effect of iron/iron carbide, providing a suitable reduction gas for the reduction zone above.

The charging operation can be stopped at different points. At the earliest, it is when the topmost layers have become carbonated so that $CO_2$ is leaving the reactor. At the latest it is when iron carbide has formed in the topmost layer. The charging process can be easily stopped or slowed down by reducing the inlet flow.

Providing the inlet gas has a sufficient reducing potential and is supplied at an adequate temperature, the balance of exothermic and endothermic reactions occurring in each of the reaction zones leads to a high degree of thermal stability and reaches equilibrium in the 600-750° C. range in which the reduction, carbonation and carburization reactions can proceed to near completion.

All reactions proceed rapidly so that full gas conversion is achievable during the charging operation.

An example reactor showing the discharge phase can be seen in FIG. 4.

At the beginning of the discharge phase, the bed is fully charged i.e. composed of $Fe_3C$ and $CaCO_3$ and at a temperature of ≈700° C. Once contacted with the $O_2$ from the air, the metal carbide is rapidly oxidized (as well as the surface carbon deposits formed during charge) to release $CO_2$ and increase the local temperature until the calcination reaction starts consuming the excess heat and releasing more $CO_2$.

As the discharge operation progresses an oxidation/calcination zone is created that moves upwards through the bed, as shown by the partial discharge taking place in FIG. 4. The bottom section of the reactor contains fully discharged material, essentially $Fe_2O_3$ and CaO which are unreactive in air, but here serve as a thermal buffer by preheating the incoming air.

The oxidation and calcination reactions take place in the middle part of the reactor, where the temperature can be expected to rise to approx. 800-850° C. in order to release the $CO_2$ by calcination.

In contrast to the charge phase, there are no thermodynamic limitations and the reaction extent is controlled by the air supply. The $CO_2$ so generated then flows through the top zone towards the exit, which acts as a thermal buffer maintaining the output temperature at ≈700° C. Any metallic Fe or $FeO_x$ remaining from incomplete charge will be oxidized by $CO_2$ at these temperatures so that a proportion of CO (up to 20%) may form in this zone.

The gas finally flows to the "capper" zone where air is added and any CO that may have been formed is oxidized to $CO_2$ by mixing with air, while the heat generated is recovered and transferred to a hot water buffer.

Similarly to the charging phase, the co-occurrence of exothermic and endothermic reactions in the reaction zone ensures the thermal stability of the system in the 750-850° C. range, and prevents any runaway reaction that could damage the reactor.

The steady-state temperature is essentially a function of the supply flow of air which controls the rate of the oxidation reaction and thereby the rate of release of $CO_2$. As a result, the rate of $CO_2$ supply can easily be adjusted or even stopped to suit greenhouse demand.

Figure 5:
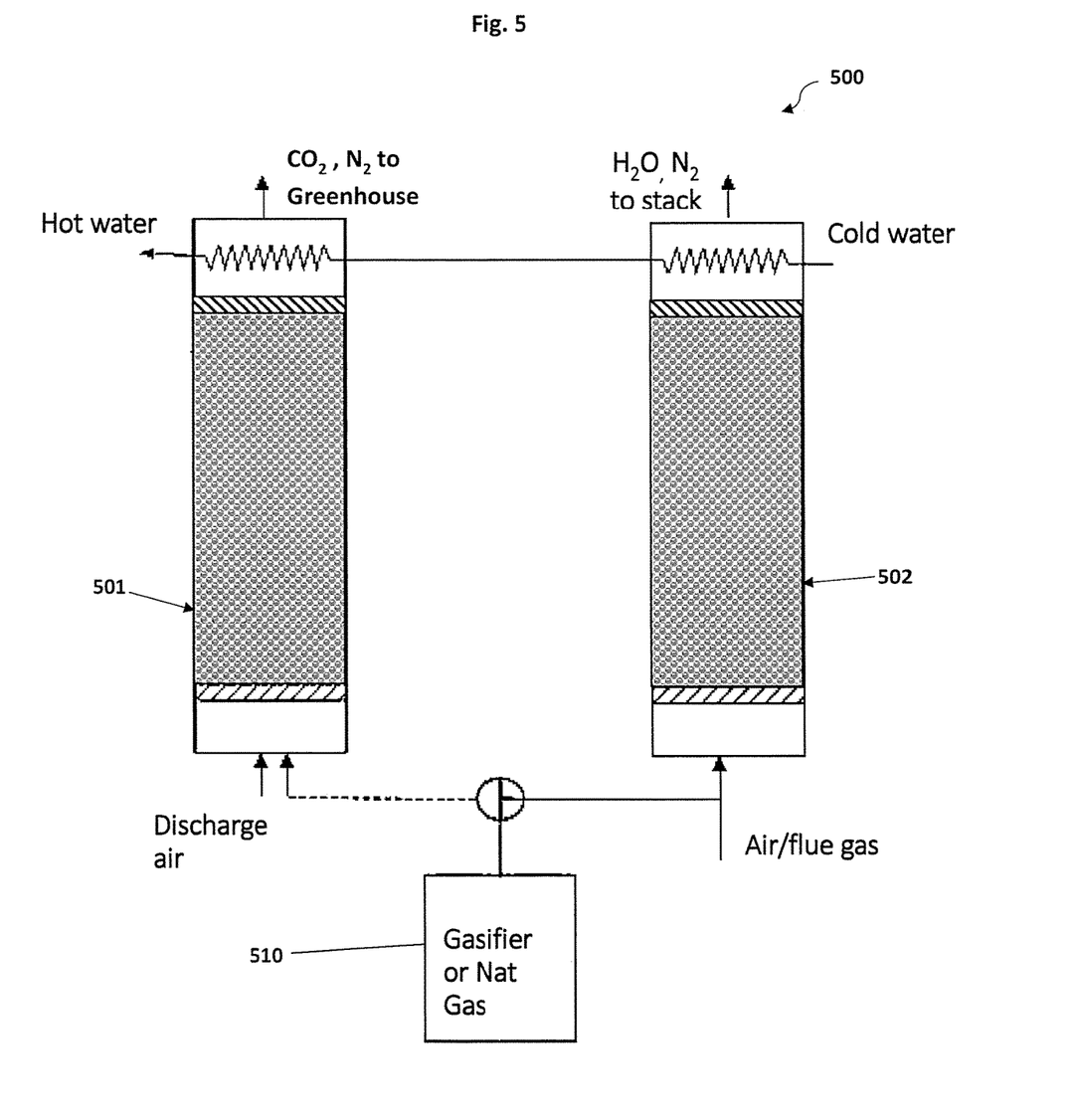
FIG. 5 shows an example of a multi-reactor apparatus in an alternative embodiment of the invention suitable for use in a greenhouse environment.

FIG. 5 shows an alternative apparatus 500 that may be particularly useful in a greenhouse environment. Apparatus 500 includes two fixed bed, batch reactors 501 and 502 alongside a source of reducing gas 510. For example, a natural gas connection or a small gasifier to make producer gas or an anaerobic digester unit. Each reactor includes three reaction zones in a similar fashion to those described in relation to FIG. 2.

In use, the two fixed beds are charged/discharged sequentially in 3 hour cycles in such a way that $CO_2$ can be continuously produced during the day when it is needed.

During the night, when $CO_2$ is not needed, both beds are charged so that they are both full at dawn. The proposed two-reactor system has advantages over the single reactor system, as it allows continuously separating the $CO_2$ generated during the day. This is a major advantage during the summer months when the days are longer.

Example 1

An example of the process as shown in FIG. 5 when integrated with a glasshouse is described in further detail below:

Basic Heat and Mass Balance modelling was performed for the charge and discharge operations for a 1 ha unit sized to deliver 1 t $CO_2$ per day.
System and Operation Parameters.
Vessels.

Two reactor vessels 501 and 502 are cylinders having a total volume of 2.5 m3.

Each vessel contains 2 m3 or 1.32 t of sorbent material with a mass composition of 16% $Fe_2O_3$, 74% CaO and 10% inorganic binder. Assuming a 20% activity for CaO, this reactor is able to store ≈250 kg of $CO_2$.
Charge Operation A typical charge operation would last three hours during which a mixture of fuel gas, air and/or flue gas is supplied to the reactor. The gases are mixed in such a way to provide a charging gas at a temperature of ≈700° C.

These restrictions set a range of acceptable proportions for gas inlets, here calculated for natural gas and producer gas, as shown in the table below:

|  | Charge Flow ($Nm^3 \cdot h^{-1}$) | | | |
| --- | --- | --- | --- | --- |
| $CH_4$ | 45 | 31 | | |
| Prod. Gas | | | 81 | 65 |
| Air | 18 | | 26 | |
| Flue gas | | 133 | | 83 |
| % Flue $CO_2$ | | 32% | | 20% |
| % Fuel Energy released in charge | 65% | 49% | 60% | 49% |
| Heat to Greenhouse (kWth) | 73 | 37 | 31 | 20 |

These values are indicative only and made using a number of coarse hypotheses. However, they provide an estimate of the required flows and the proportion of $CO_2$ that can be recovered from a flue gas (≈20-30%) in both cases.

The charging continues for 3 h at which point CaO is saturated in $CO_2$ and maximum capacity is reached. Depending on the heat of combustion to $CO_2$ ratio of different fuels, a proportion of unoxidized gas will break through and have to be combusted in the "capper" zone. The cooled, $CO_2$ lean, outlet gas is then sent to the stack. The "capper" heat capacity was calculated and found to remain low in all the scenarios calculated (1/15th of the full heating capacity of the greenhouse) as shown in the table above.
Discharge Operation Once the bed is fully charged the inlet gas is replaced by a flow of air proportional to the desired $CO_2$ output. In typical operation the supply is constant and set at 86 kg·h−1 which requires an air supply estimated at 233 m3·h−1. Basic heat and mass balances suggest that the outlet gas would contain ≈29.6% $CO_2$ in N2 and that the "capper" zone would have to recover and transfer to the glasshouse the percentage of heat stored (i.e. not emitted) during the charge phase, which also is rather low compared to the full heating capacity of the greenhouse. The heat generated is recovered stored in the hot water buffer.

The reaction processes of the present method are facilitated by the use of a sorbent material 50, as seen in a diagrammatic representation in FIG. 8. The sorbent material is adapted to store and release carbon dioxide depending on the phase of the reaction being implemented. The reactor vessel is filled with the sorbent material, the sorbent material adapted to allow gases to move freely around the material in order to facilitate the reactions.

The sorbent material may be a mixture, combination, composite or mixture of an alkaline earth oxide and a transitional metal oxide. The preferred sorbent material is formed using calcium oxide (CaO) and iron ore ($Fe_2O_3$). Both calcium oxide and iron ore are readily available and economical to purchase, making them particularly suitable for this material and reaction process. As iron produces a significant amount of heat during oxidation, making it further suitable for meeting the thermodynamic requirements of the methods and process of this invention.

The sorbent material of the invention is preferably a composite material generated using a standard pelletization process with each pellet containing a calcium/iron ratio of between 1:3-10:1. The pellets may be of a range of sizes and shapes, provided they are large enough to enable gas flow around the pellets when inside a reactor.

Other forms of calcium oxide and iron ore may also be used to form the sorbent material, such as a mixture of pellets of separate compounds at correct ratios, or a combination of a composite material and separate compounds.

A small amount of catalyst may also be incorporated in the sorbent material. The catalyst may include nickel, cobalt, platinum or rhodium or other transition metal catalysts for example.

The surface of the material may be irregular, smooth, symmetrical or very rough, depending on the level of reaction required and the system in which the material will be used.

In further preferred embodiments the sorbent material is a pelletized composition of calcium oxide, iron ore and a suitable inorganic binder, for example, bentonite. Other inorganic binders may be selected from alumina silicate, Portland cement, calcium aluminate cements, calcium hydroxide, sodium silicate, bentonite or clays. By combining the components in a single particle the heat transfer efficiency between the particles is maximised.

In some examples of a sorbent material of the present invention, the sorbent material is formed from 50-75% wt. calcium oxide, 15%-40% wt. iron ore and 5%-15% wt. of an inorganic binder.

An organic binder may also be incorporated into the sorbent material during the pellet preparation in order to improve the plasticity of the powder mixture, the mechanical strength and the porosity of the final pellets produced.

The organic binder is preferably around 0.1-20% of the pellet mass before firing. The organic binder may be selected from one or more of the following groups; polyvinyl alcohols, starches, dextrin, cellulose polymers, polyethylene glycols, lignosulfonates, bitumen, paraffins, wax emulsions and polyacrilates.

Preferably the porosity of the sorbent material in its final form is greater than 20%, which allows good penetration of the gas and strengthens against breakage induced by carbon deposition.

In alternative embodiments of the invention, solid biomass may also be used as a fuel either independently, or in conjunction with a fuel gas. In order to recover $CO_2$ from a solid fuel such as biomass using the methods of the present invention it is necessary to vaporize it first. A proportion of the $CO_2$ required can come from the exhaust of a typical biomass boiler (approx. 20-30% of the total $CO_2$ recovered) while the rest must be supplied from a combustible carbon-containing gas, for example natural gas, producer gas, pyrolysis gas or anaerobic digestion gas which must first be produced if $CO_2$ is to be recovered from solid biomass.

There area number of ways to achieve this gas production using partial combustion, gasification, pyrolysis and biological digestion techniques.

Updraft gasifiers or pyrolysis units appear particularly suitable for this application as their advantages are very beneficial for this particular application. These include fuel flexibility, high energy efficiency, ability to easily stop/start operation, a good turn down ratio, simplicity and low capital cost.

The main disadvantage with these units is typically considered to be the presence of significant amounts of tar in the producer gas. However, when used with the current methods, the presence of tars is advantageous, as their reforming to $CO/H_2$ is strongly endothermic, assisting with the establishment of a thermal balance during charging. The significant proportion of tars that are usually present in the updraft gasifier would be cracked/reformed in the reactor unit containing the sorbent material.

The updraft gasifier or pyrolysers and the apparatus of the present invention unit exhibit a favourable synergy in this respect as both CaO, $FeO_x$ and metallic Fe are known to catalyse tar cracking/reforming reactions. In addition, the presence of CaO helps drive the cracking and reforming reactions by removing their ultimate product ($CO_2$) from the gas phase. If necessary, small amounts of additional catalyst may have to be added to the sorbent material unit to ensure the full and complete conversion of the tars in the gas.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A method for capturing, storing, and releasing carbon dioxide, the method including the steps of:
   a) contacting a heated gaseous fuel stream with a transition metal oxide;
   b) reducing the transition metal oxide to form a transition metal and carbon dioxide;
   c) carburizing or partially carburizing the transition metal to form an amount of metal carbide;
   d) contacting the carbon dioxide with an alkaline metal oxide or alkaline earth metal oxide to form an alkaline metal carbonate or alkaline earth metal carbonate
   e) contacting the metal carbide or mixture of transition metal and metal carbide formed in step c) with air to produce a transition metal oxide and carbon dioxide; and
   f) calcining the alkaline metal carbonate or alkaline earth metal carbonate of step d) to form carbon dioxide and an alkaline metal oxide or alkaline earth metal oxide.

2. The method of claim 1, wherein the method includes a preliminary step of creating the heated gaseous fuel stream by mixing the fuel stream with air.

3. The method of claim 1, wherein the gaseous fuel stream is heated to 500-900° C.

4. The method of claim 1, wherein the method as described in steps a)-e) is conducted within a temperature range of 600-800° C.

5. The method of claim 1, wherein a rate of release of carbon dioxide at steps e) and f) is controlled by a rate of contact between the transition metal carbide and air.

6. The method of claim 1, wherein the fuel stream is contacted with a transition metal oxide and alkaline metal oxide or alkaline metal earth metal oxide substantially simultaneously.

7. The method of claim 6, wherein the transition metal oxide and alkaline metal oxide or alkaline earth metal oxide are combined in a composite sorbent material.

8. The method of claim 7, wherein the sorbent material includes calcium oxide (CaO) and iron ore ($Fe_2O_3$).

9. The method of claim 1, wherein the step of carburizing or partially carburizing the transition metal to form an amount of metal carbide comprises forming the amount of metal carbide in parallel with deposition of carbon on surfaces of at least the transition metal, and wherein the carburizing is completed or partially completed such that a maximum level of carbon deposition is below a metal/carbon ratio of 0.9.

10. The method of claim 1, wherein the carburization step c) is only partially completed and the transition metal oxide is reduced to a mixture of metal carbide and metal or a lower oxidation level metal oxide.

11. The method of claim 1, wherein the steps are performed by an apparatus for capturing, storing, and releasing carbon dioxide, the apparatus comprising:
a) a gas inlet for delivering a heated gaseous fuel stream;
b) a reactor for receiving a heated gaseous fuel stream, contacting the heated gaseous fuel stream with a transition metal oxide to form a transition metal, metal carbide or mixture of metal carbide and metal or a lower oxidation level metal oxide, and carbon dioxide, and contacting the carbon dioxide with an alkaline metal oxide or alkaline earth metal oxide to form an alkaline metal carbonate or alkaline earth metal carbonate;
c) an air inlet for contacting the transition metal carbide with air to facilitate production of a transition metal oxide and carbon dioxide, and calcination of the metal carbonate or alkaline earth metal carbonate to form carbon dioxide and an alkaline metal oxide or alkaline earth metal oxide; and
d) a gas outlet for discharging carbon dioxide to an external environment.

* * * * *